Figure 1:
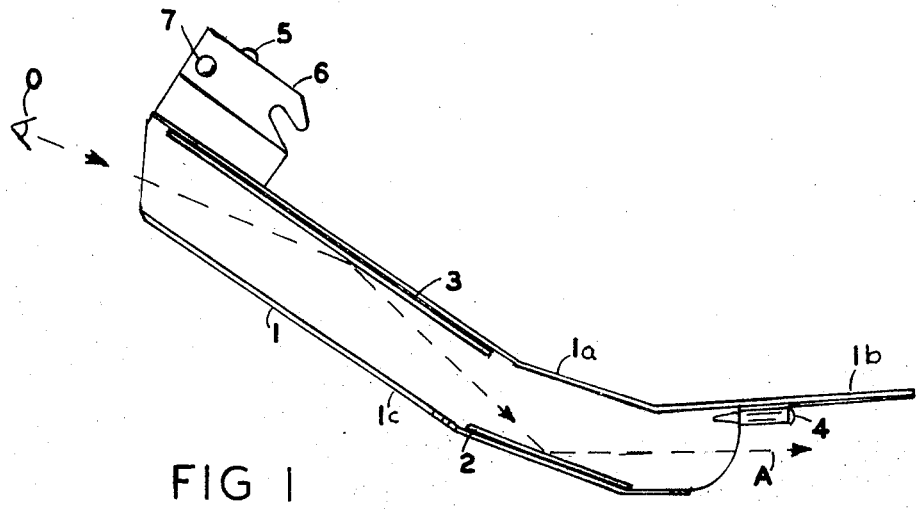

United States Patent

Felbarg

[15] 3,643,654
[45] Feb. 22, 1972

[54] ILLUMINATING LARYNGOSCOPE WITH REFLECTING MEANS

[72] Inventor: Hector R. Felbarg, 12 Kingsley Road, Huntington, N.Y.

[22] Filed: Sept. 14, 1970

[21] Appl. No.: 72,044

Related U.S. Application Data

[63] Continuation-in-part of Ser. No. 733,394, May 31, 1968.

[52] U.S. Cl. .............................................. 128/11, 350/301
[51] Int. Cl. .................................................... A61b 1/06
[58] Field of Search ........................... 128/3, 4, 5, 6, 10, 11; 350/301; 356/241

[56] References Cited

UNITED STATES PATENTS

| 348,843 | 9/1886 | Hamilton | 128/5 |
| 1,556,355 | 10/1925 | Roney | 128/6 |
| 2,377,671 | 6/1945 | Burlo | 350/301 |
| 3,019,689 | 2/1962 | Paulsrud | 350/301 |

*Primary Examiner*—Channing L. Pace
*Attorney*—James P. Malone

[57] ABSTRACT

A laryngoscope of the type comprising a tubelike member of U-shaped cross section, open on one side and having a light source at the end thereof. The member has a flattened bend having an interior angle of more than 90°. A first mirror is mounted on the bottom interior of the tubular member in the area of the bend and a second mirror is mounted on the upper interior of the tubular member near the operator's end so that the operator can look at the second mirror and see a right-side-up image of the throat and larynx at the end of the blade.

1 Claims, 2 Drawing Figures

PATENTED FEB 22 1972 3,643,654

INVENTOR.
HECTOR R. FELBARG

ILLUMINATING LARYNGOSCOPE WITH REFLECTING MEANS

This application is a continuation in part of prior copending application, Ser. No. 733,394, filed May 31, 1968 for ILLUMINATING LARYNGOSCOPE WITH REFLECTING MEANS.

This invention relates to laryngoscopes, and more particularly, to such means having a flattened bend configuration with internal mirrors for viewing the operating area of the throat and larynx right side up.

Conventional laryngoscopes generally comprise a straight blade of material such as stainless steel, which has a light at the operating end thereof. The device is held by the operator with a removable handle which contains a battery for the light. Conventional laryngoscope blades are generally straight and do not provide the optimum working and viewing means. In many cases, it is necessary in order to obtain a proper view due to the shape of the patient's mouth, teeth and jaws, that the laryngoscope be bent. The difficulty with this construction is that the operator cannot then see around the bend. If a single mirror is inserted in the area of the bend, then the view of the operating area is upside down.

The applicant has solved the above problems and provided a new and improved laryngoscope of generally U-shaped cross section with one open side and which is bent and has two interior mirrors so that the operator may see a view of the operating area right side up. One of the mirrors is mounted on the bottom interior of the tube at the apex of the bend and the other of the mirrors is mounted on the upper inside of the tubelike member adjacent the operator's end. The mirrors are positioned so that the operator may look into the mirror and see along the axis of the tube and obtain a view which is right side up.

Accordingly, a principal object of the invention is to provide new and improved laryngoscope means.

Another object of the invention is to provide new and improved laryngoscope means having a bent configuration.

Another object of the invention is to provide a new and improved laryngoscope means which are bent and which has a pair of interior mirrors so that the operator can view the operating area right side up.

Another object of the invention is to provide new and improved laryngoscope means comprising a tubelike member having an open end and one open side of generally U-shaped cross section, a light source mounted adjacent one end of said member, the other end of said member being adapted to be mounted in a handle, said tubelike member having a flattened bend in the central portion thereof having an interior angle of more than 90°, a first mirror mounted on the lower interior surface of said member in the area of said bend, and a second mirror mounted on the upper inside surface of said member adjacent said other end, said mirrors being positioned so that the operator can look at said second mirror and see said first mirror along the axis of said tubelike member and out the end thereof so that the image of the throat and larynx viewed through said open end of said tube will be right side up, said tubelike member having dimensions suitable for throat and larynx.

Figure 2:
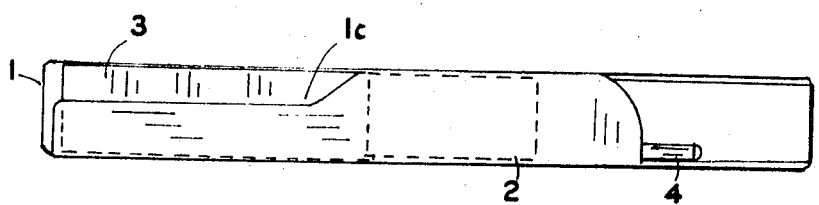

These and other objects of the invention will be apparent from the following specification and drawings, of which:

FIG. 1 is a side view of the embodiment of the invention.
FIG. 2 is a bottom view of FIG. 1.

The invention generally comprises a tubelike member 1 having one fully open side and having a generally U-shaped cross section. The member 1 has a flattened bend 1a which forms an interior angle of more than 90°. A first mirror 2 is mounted on the lower interior portion of the bend and a second mirror 3 is mounted on the upper interior surface of the member 1. Therefore, the observer O can look in the direction of the arrows and see an image right side up around the bend. The observer looks at the mirror 3 and is able to see by means of the mirror 2 along the axis A and out the open end of the tube member.

The member 1 has an extending blade portion 1b and an electric light 4. The light is connected in conventional manner by a wire, not shown, which is embedded in the member 1, which is connected in the contact 5 in the connection member 6. The connection member 6 is adapted to be mounted on a conventional handle which contains a battery which is connected through the contact 5 to the light 4.

The member 7 is a spring-loaded detent which acts to lock the mounting member 6 in the handle and provide a good ground contact for the electric light circuit.

The mirror 3 is longer than the mirror 2 so as to provide flexibility of positioning of the device without degrading the image along the axis A. It has been found that the mirror 3 should be twice as long as the mirror 2 for optimum flexibility of operation. The mirrors may be of stainless steel and they are cemented into place in the interior surfaces of the tubelike member 1.

The cross section of the member 1 is not critical and a generally U-shaped cross section has been found preferable. The flat area in the bend is required since the mirror 2 must be a flat surface. The top and bottom surfaces must be parallel for mounting the mirrors so that the optical axis A will be generally parallel to the axis of the member 1 at the lower end and not twisted.

FIG. 2 shows a bottom view of FIG. 1. The bottom surface of the mirror 1 has a cutout portion 1c which permits viewing from a side angle. The arrangement of the two mirrors permits the observer to see an image right side up of the throat and larynx.

The U-shaped configuration provides guide means for inserting an anesthesia tube and implements such as swabs.

I claim:

1. Laryngoscope means comprising a tubelike member leaving top and bottom walls connected by a sidewall on the interior of the top and bottom walls said tubelike member having a flattened bend in the central portion thereof having an interior angle of more than 90°,
a first mirror mounted on the interior surface of one of said walls in the area of said bend,
and a second mirror mounted on the inside surface of the other of said walls adjacent said other end,
said mirrors being positioned so that an operator can look at said second mirror and see said first mirror along the axis of said tubelike member and out the end thereof so that the image of the throat and larynx viewed through said open end of said tube will be right side up, said tubelike member having dimensions suitable for throat and larynx, the bottom wall of said member being partially cut away at the handle end to permit viewing at a side angle and means to connect said tubelike member mechanically and electrically to a handle.

* * * * *